(12) United States Patent
Elsayad et al.

(10) Patent No.: US 10,630,202 B2
(45) Date of Patent: Apr. 21, 2020

(54) THREE PHASE INVERTER SYSTEM USING AN EIGHT-SWITCH-THREE-PHASE UNFOLDER

(71) Applicants: Noureldeen Mohamed Elsayad, Miami, FL (US); Osama Mohammed, Miami, FL (US)

(72) Inventors: Noureldeen Mohamed Elsayad, Miami, FL (US); Osama Mohammed, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/873,476

(22) Filed: Jan. 17, 2018

(65) Prior Publication Data
US 2019/0222139 A1 Jul. 18, 2019

(51) Int. Cl.
| | |
|---|---|
| *H02M 7/49* | (2007.01) |
| *H02M 7/5395* | (2006.01) |
| *H02M 7/797* | (2006.01) |
| *H02M 7/5387* | (2007.01) |
| *H02M 7/497* | (2007.01) |
| *H02M 1/00* | (2006.01) |

(52) U.S. Cl.
CPC .......... *H02M 7/49* (2013.01); *H02M 7/497* (2013.01); *H02M 7/5395* (2013.01); *H02M 7/53871* (2013.01); *H02M 7/797* (2013.01); *H02M 2001/007* (2013.01)

(58) Field of Classification Search
None
See application file for complete search history.

(56) References Cited

U.S. PATENT DOCUMENTS

| | | | |
|---|---|---|---|
| 2009/0116266 A1* | 5/2009 | Lai .................. | H02M 7/493 363/40 |
| 2015/0061569 A1* | 3/2015 | Alexander ......... | B60L 3/0092 320/101 |
| 2016/0336873 A1* | 11/2016 | Ayai ................ | H02M 3/33576 |

* cited by examiner

*Primary Examiner* — Jue Zhang
(74) *Attorney, Agent, or Firm* — Saliwanchik, Lloyd & Eisenschenk

(57) ABSTRACT

A three phase inverter can include: a first converter and a second converter connected to an input source in parallel, respectively; a first single phase inverter connected to the first converter through a first inverter first input node and a first inverter second input node and providing a first inverter first output node and a first inverter second output node; a second single phase inverter connected to the second converter through a second inverter first input node and a second inverter second input node and providing a second inverter first output node and a second inverter second output node; and a common output node connected to the first inverter first output node and the second inverter first output node.

12 Claims, 8 Drawing Sheets

THREE PHASE INVERTER SYSTEM USING AN EIGHT-SWITCH-THREE-PHASE UNFOLDER

BACKGROUND

Compact three phase inverters have a significant importance in the integration of high power embedded renewable energy sources, nanogrids, and electrification of transportation, where the size and weight of the DC/AC power processing system are critical design aspects. However, these three phase inverters require a large number of high frequency switches, which are expensive and require a bulky cooling system.

BRIEF SUMMARY

Embodiments of the subject invention provide novel and advantageous three phase inverters that use an eight-switch-three-phase unfolder circuit operating at a line frequency, thereby reducing the number of high frequency switches, thus minimizing the cooling system requirement.

In an embodiment, a three phase inverter can comprise: a converter circuit providing a first output voltage and a second output voltage; a first unfolder including a first leg and a second leg that are connected to the first output voltage through a first unfolder first input node and a first unfolder second input node; and a second unfolder including a third leg and a fourth leg that are connected to the second output voltage through a second unfolder first input node and a second unfolder second input node, a first unfolder first output node of the first leg being connected to a second unfolder first output node of the third leg through an unfolder common output node, the second leg providing a first unfolder second output node, the fourth leg providing a second unfolder second output node, each of the first to fourth leg comprising two switches.

In another embodiment, a three phase inverter can comprise: a first converter and a second converter connected to an input source in parallel, respectively; a first single phase inverter connected to the first converter through a first inverter first input node and a first inverter second input node and providing a first inverter first output node and a first inverter second output node; a second single phase inverter connected to the second converter through a second inverter first input node and a second inverter second input node and providing a second inverter first output node and a second inverter second output node; and a common output node connected to the first inverter first output node and the second inverter first output node.

In yet another embodiment, a three phase inverter can comprise: a first DC-DC converter connected to an input source; a second DC-DC converter connected to the input source; a first inverter first switch connected to the first DC-DC converter through a first inverter first input node; a first inverter second switch connected to the first DC-DC converter through a first inverter second input node and connected to the first inverter first switch through a first inverter first output node; a first inverter third switch connected to the first DC-DC converter through the first inverter first input node; a first inverter fourth switch connected to the first DC-DC converter through the first inverter second input node and connected to the first inverter third switch through a first inverter second output node; a second inverter first switch connected to the second DC-DC converter through a second inverter first input node; a second inverter second switch connected to the second DC-DC converter through a second inverter second input node and connected to the second inverter first switch through a second inverter first output node; a second inverter third switch connected to the second DC-DC converter through the second inverter first input node; a second inverter fourth switch connected to the second DC-DC converter through the second inverter second input node and connected to the second inverter third switch through a second inverter second output node; a common output node connected to the first inverter first output node and the second inverter first output node; and a controller providing a first signal to the first inverter second switch and the first inverter third switch, a second signal to the first inverter first switch and the first inverter fourth switch, a third signal to the second inverter first switch and the second inverter fourth switch, and a fourth signal to the second inverter second switch and the second inverter third switch.

DETAILED DESCRIPTION

Embodiments of the subject invention provide novel and advantageous three phase inverters that use an eight-switchthree-phase (ESTP) unfolder circuit operating at a line frequency, thereby eliminating a DC link capacitor and minimizing the cooling system requirement.

A three phase inverter system of an embodiment of the subject invention reduces the number of high frequency switching semiconductor devices in the three phase inverter system, which reduces the total cost, weight and size. Three phase inverter systems of embodiments of the subject invention can significantly reduce the number of high frequency switching semiconductor devices, thereby can be effectively used in the industries including the renewable energy systems and electric vehicles.

Figure 1A:
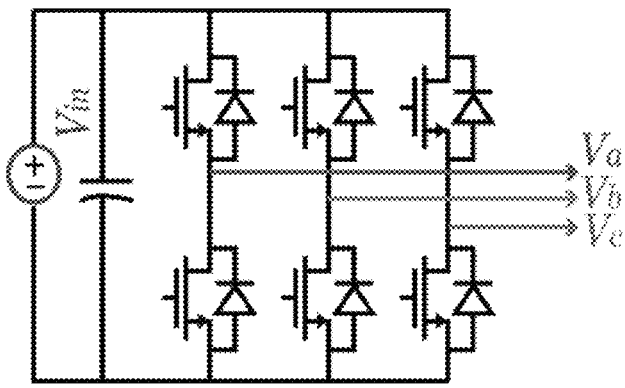
FIG. 1(a) shows a three phase voltage source inverter for Buck operation only.
Figure 1B:
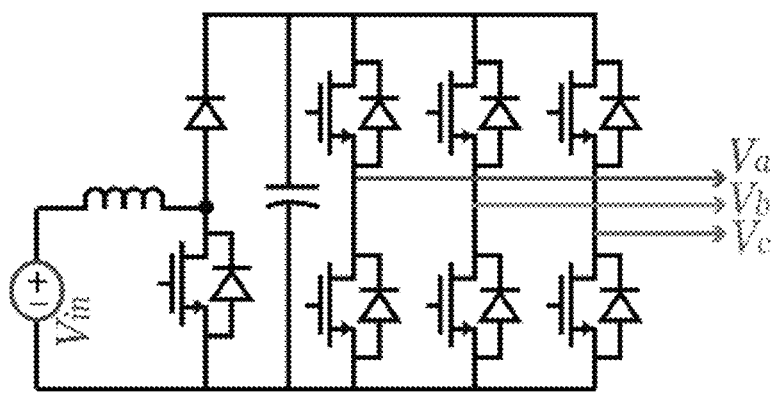
FIG. 1(b) shows a three phase voltage source inverter with a unidirectional boost converter.
Figure 1C:
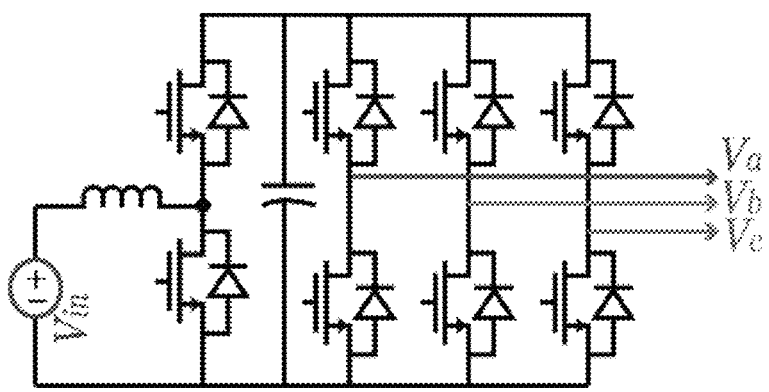
FIG. 1(c) shows a three phase voltage source inverter with a bidirectional boost converter.

FIGS. 1(a), 1(b), and 1(c) show a conventional three phase voltage source inverter (VSI). FIG. 1(a) shows a three phase VSI for Buck operation only, which is the most commonly utilized three-phase inverter. Referring to FIG. 1(a), the VSI comprises three legs in push-pull configuration, and a common-mode voltage has to be added to the output of each leg. In this three-phase buck VSI, six switches operating at high frequency are required.

FIGS. 1(b) and 1(c) show a three phase voltage source inverter with a unidirectional boost converter and with a bidirectional boost converter, respectively. Referring to FIGS. 1(b) and 1(c), a boost stage can be added before the three-phase buck VSI to increase the voltage level of the dc supply (Vin), and this boost converter can be unidirectional or bidirectional. For systems shown in FIG. 1(b) and FIG. 1(c), seven switches operating at high frequency are required.

Figure 2A:
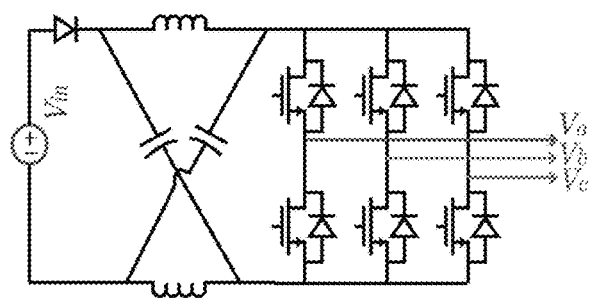
FIG. 2(a) shows a unidirectional three phase Z source inverter.
Figure 2B:
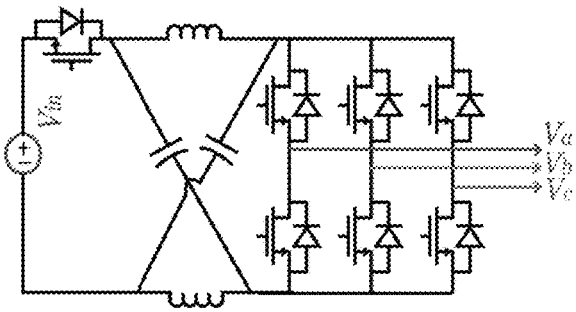
FIG. 2(b) shows a bidirectional three phase Z source inverter.
Figure 2C:
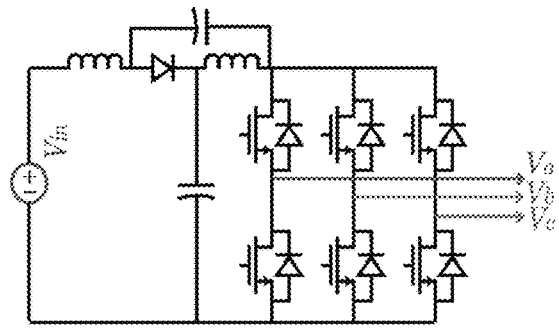
FIG. 2(c) shows a unidirectional three phase quasi Z source inverter.
Figure 2D:
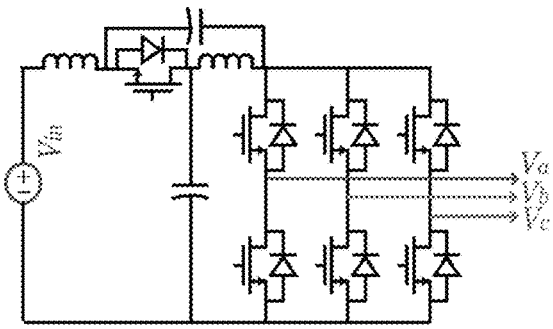
FIG. 2(d) shows a bidirectional three phase quasi Z source inverter.

Each of FIGS. 2(a) to 2(d) shows a conventional three phase Z source inverter (ZSI). Referring to FIGS. 2(a) to 2(d), the ZSI is a single-stage buck-boost inverter, where the dc supply voltage level can be pushed up without the need to a separate boost converter. FIG. 2(a) shows the unidirectional version of the ZSI and FIG. 2(b) shows the bidirectional version of the ZSI. The quasi ZSI (qZSI) having a smooth input current improves performance of the ZSI, thus it is suitable for renewable energy and energy storage systems. The unidirectional version and bidirectional version of the qZSI are shown in FIG. 2(c) and 2(d), respectively. Referring to FIGS. 2(a) to 2(d), both of ZSI and qZSI have six switches operating at high frequency.

Figure 3A:
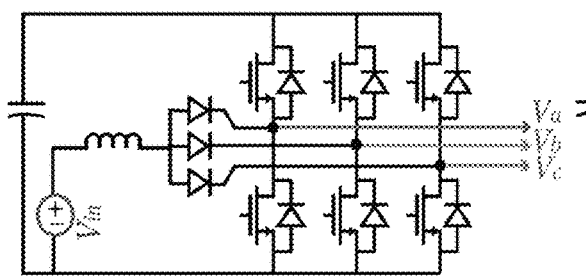
FIG. 3(a) shows a unidirectional three phase split source inverter.
Figure 3B:
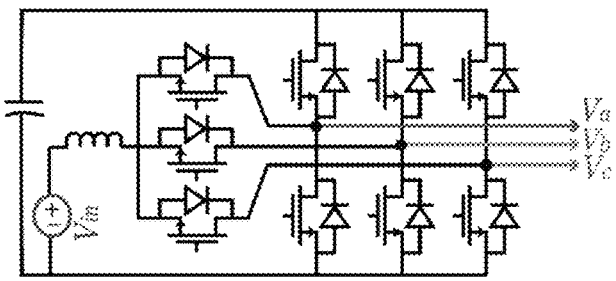
FIG. 3(b) shows a bidirectional three phase split source inverter.

FIG. 3(a) shows a unidirectional three phase split source inverter, and FIG. 3(b) shows a bidirectional three phase split source inverter. The three phase split source inverter (SSI) is an alternative to the ZSI and qZSI, where the dc supply voltage can be stepped up without the need to a separate boost converter. Referring to FIGS. 3(a) and 3(b), the three phase SSI also has six switches operating at high frequency. Though the bidirectional three phase SSI includes the other three switches, the other three switches do not operate at high frequency but operate at low frequency.

Figure 4A:
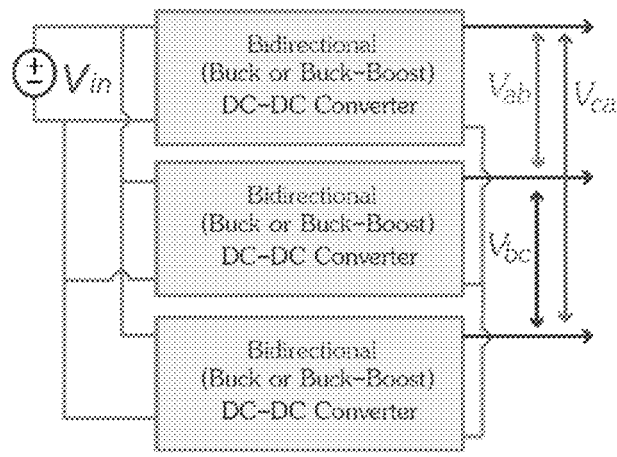
FIG. 4(a) shows a generic three phase differential mode inverter connection diagram.
Figure 4B:
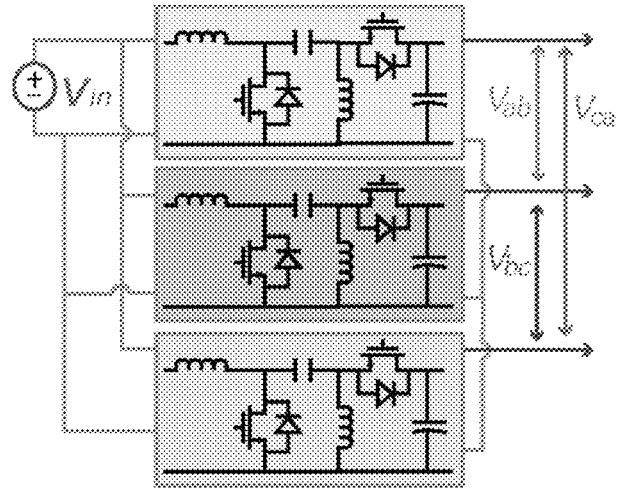
FIG. 4(b) shows a non-isolated Ćuk three phase differential mode inverter.
Figure 4C:
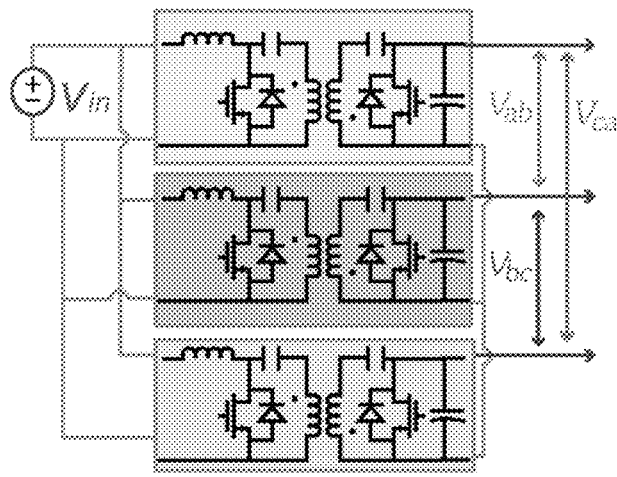
FIG. 4(c) shows an isolated Ćuk three phase differential mode inverter.

FIG. 4(a) shows a generic three phase differential mode inverter (DMI) connection diagram. FIG. 4(b) shows a non-isolated Ćuk three phase DMI and FIG. 4(c) shows an isolated Ćuk three phase DMI. Referring to FIG. 4(a), the basic construction of the DMI is three bidirectional buck or buck-boost DC-DC converters connected in such a way that all of them have a common ground. Each converter generates an "ac voltage component" with a dc offset, such that the sum is either in the positive or negative voltage plane. Many DC-DC converters can be used to synthesize the DMI, like: Sepic, Ćuk, buck-boost . . . etc. Referring to FIGS. 4(b) and 4(c), the least number of switches operating at high frequency for a three-phase DMI is six switches. In FIG. 4(b), a DMI is synthesized with three bidirectional non-isolated Ćuk converters, while FIG. 4(c) shows a DMI that is synthesized with three bidirectional isolated Ćuk converters.

Figure 5A:
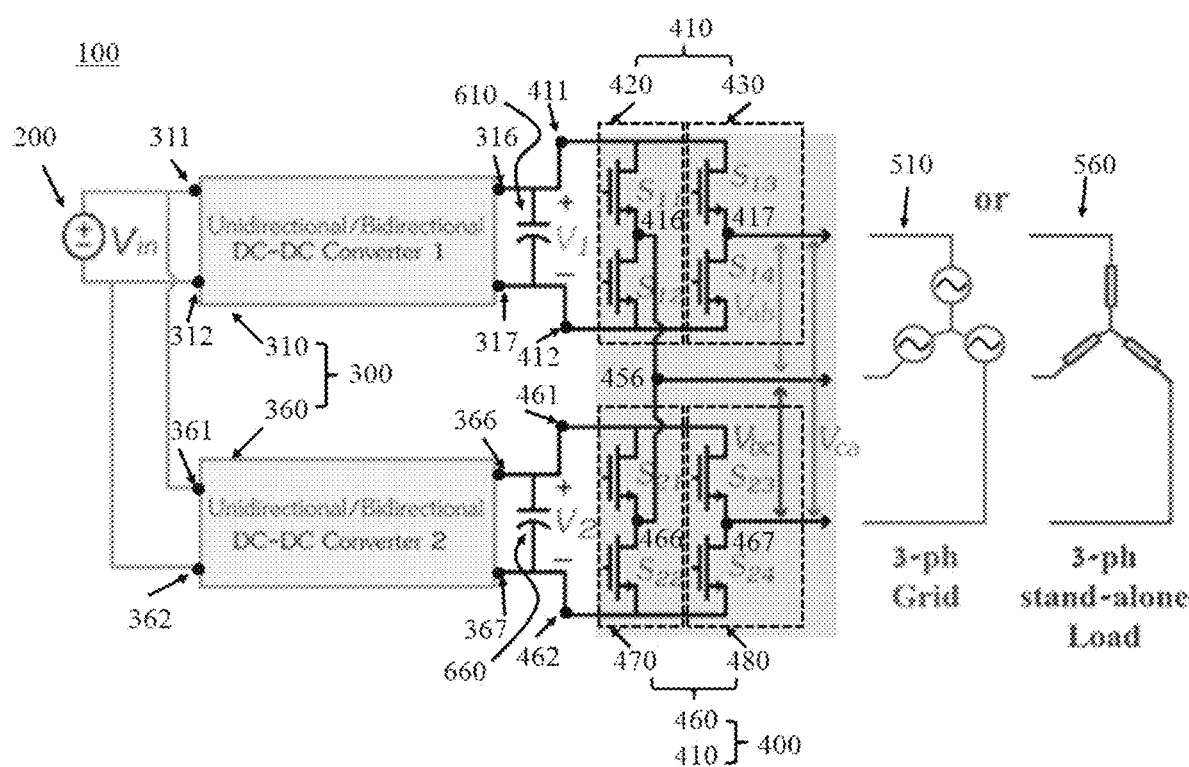
FIG. 5(a) shows a three phase inverter system using an unfolder circuit according to an embodiment of the subject invention.

FIG. 5(a) shows a three phase inverter system using an unfolder circuit according to an embodiment of the subject invention. The three phase inverter can comprise two circuits, each circuit is dedicated to generate a line-to-line voltage. Each circuit comprises a DC-DC converter and an unfolder circuit. The DC-DC converter can be unidirectional or bidirectional, and it can be non-isolated or isolated. The main function of this DC-DC converter is to convert the dc input voltage to a folded version of a line-to-line voltage. The unfolder circuit comprises a single phase inverter (H-bridge), that flips the polarity of the DC-DC converter output voltage every 1/(2×line frequency (50 Hz or 60 Hz)) seconds.

The unfolder circuit comprises four switches operating at the line frequency (50 Hz or 60 Hz), and the switching loss can be omitted because the switches operate at zero voltage. This results in minimal cooling requirement for the unfolder circuit. So, for a three-phase inverter, two DC-DC converters operating at high frequency and two unfolder circuits operating at the line frequency with negligible switching losses are utilized, thereby reducing the total number of high frequency switches.

The DC-DC converters should be built with power switches that have the capability to switch at high frequencies with low switching loss. Silicon Carbide (SiC) Mosfets or Gallium Nitride (GaN) HEMTs are used for the DC-DC converters' stage. The eight switches of the two unfolder circuits can be low frequency switches with low drain-to-source on resistance.

Referring to FIG. 5(a), the three phase inverter 100 comprises a converter circuit 300 including a first DC-DC converter 310 and a second DC-DC converter 360, and an unfolder circuit 400 including a first unfolder 410 and a second unfolder 460. That is, the three phase inverter 100 comprises two DC-DC converters and two unfolders.

The first DC-DC converter 310 is connected to an input source 200 through a first converter first input node 311 and a first converter second input node 312 such that the first DC-DC converter 310 receives an input Vin. The first DC-DC converter 310 provides a first converter output $V_1$ through a first converter first output node 316 and a first converter second output node 317.

The second DC-DC converter 360 is connected to the input source 200 through a second converter first input node 361 and a second converter second input node 362 such that the second DC-DC converter 360 receives the input Vin. The second DC-DC converter 360 provides a second converter output $V_2$ through a second converter first output node 366 and a second converter second output node 367.

Each of the first unfolder 410 and the second unfolder 460 is a single phase inverter having an H-bridge structure and includes four switches. The first unfolder 410 includes a first unfolder first input node 411, a first unfolder second input node 412, a first unfolder first output node 416, and a first unfolder second output node 417. The first unfolder first input node 411 and the first unfolder second input node 412 are connected to the first converter first output node 316 and the first converter second output node 317, respectively, thereby allowing the first unfolder 410 to receive the first converter output $V_1$ through the first unfolder first input node 411 and the first unfolder second input node 412.

The first unfolder 410 comprises a first leg 420 including a first unfolder first switch $S_{11}$ and a first unfolder second switch $S_{12}$, and a second leg 430 including a first unfolder third switch $S_{13}$ and a first unfolder fourth switch $S_{14}$. The first unfolder first switch $S_{11}$ is connected to the first unfolder first input node 411, the first unfolder second switch $S_{12}$ is connected to the first unfolder second input node 412, and the first unfolder first switch $S_{11}$ and the first unfolder second switch $S_{12}$ are connected to each other through the first unfolder first output node 416. The first unfolder third switch $S_{13}$ is connected to the first unfolder first input node 411, the first unfolder fourth switch $S_{14}$ is connected to the first unfolder second input node 412, and the first unfolder third switch $S_{13}$ and the first unfolder fourth switch $S_{14}$ are connected to each other through the first unfolder second output node 417.

Similar to the first unfolder 410, the second unfolder 460 includes a second unfolder first input node 461, a second unfolder second input node 462, a second unfolder first output node 466, and a second unfolder second output node 467. The second unfolder first input node 461 and a second unfolder second input node 462 are connected to the second converter first output node 366 and the second converter second output node 367, respectively, thereby allowing the second unfolder 460 to receive the second converter output $V_2$ through the second unfolder first input node 461 and the second unfolder second input node 462.

The second unfolder 460 comprises a third leg 470 including a second unfolder first switch $S_{21}$ and a second unfolder second switch $S_{22}$, and a fourth leg 480 including a second unfolder third switch $S_{23}$ and a second unfolder fourth switch $S_{24}$. The second unfolder first switch $S_{21}$ is connected to the second unfolder first input node 461, the second unfolder second switch $S_{22}$ is connected to the second unfolder second input node 462, and the second unfolder first switch $S_{21}$ and the second unfolder second switch $S_{22}$ are connected to each other through the second unfolder first output node 466. The second unfolder third switch $S_{23}$ is connected to the second unfolder first input node 461, the second unfolder fourth switch $S_{24}$ is connected to the second unfolder second input node 462, and the second unfolder third switch $S_{23}$ and the second unfolder fourth switch $S_{24}$ are connected to each other through the second unfolder second output node 467.

The first unfolder first output node 416 and the second unfolder first output node 466 are connected to each other through an unfolder common output node 456. Thus, the three phase inverter 100 provides a first phase output $V_{ab}$ between the first unfolder second output node 417 and the unfolder common output node 456, a second phase output $V_{bc}$ between the unfolder common output node 456 and the second unfolder second output node 467, and a third phase output $V_{ca}$ between the first unfolder second output node 417 and the second unfolder second output node 467. A three phase grid 510 or a three phase stand-alone load 560 is configured to be connected to the first unfolder second output node 417, the unfolder common output node 456, and the second unfolder second output node 467 as to receive the first phase output $V_{ab}$, the second phase output $V_{bc}$, and the third phase output $V_{ca}$. In addition, a first capacitor 610 and a second capacitor 660 can be connected to the first DC-DC converter 310 and the second DC-DC converter 360, respectively.

Figure 5B:
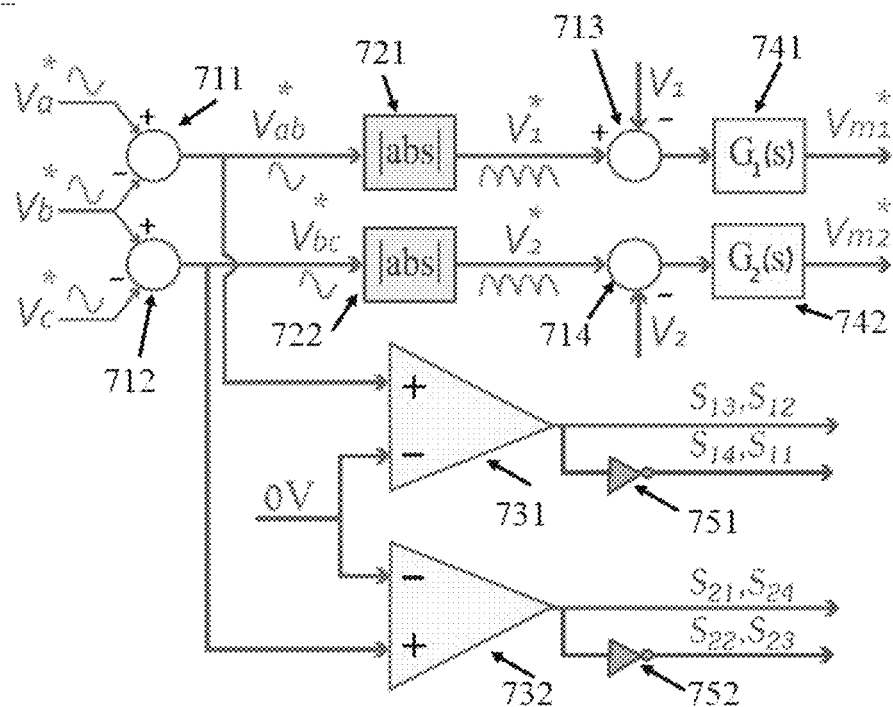
FIG. 5(b) shows a controller of a three phase inverter system according to an embodiment of the subject invention.
Figure 5C:
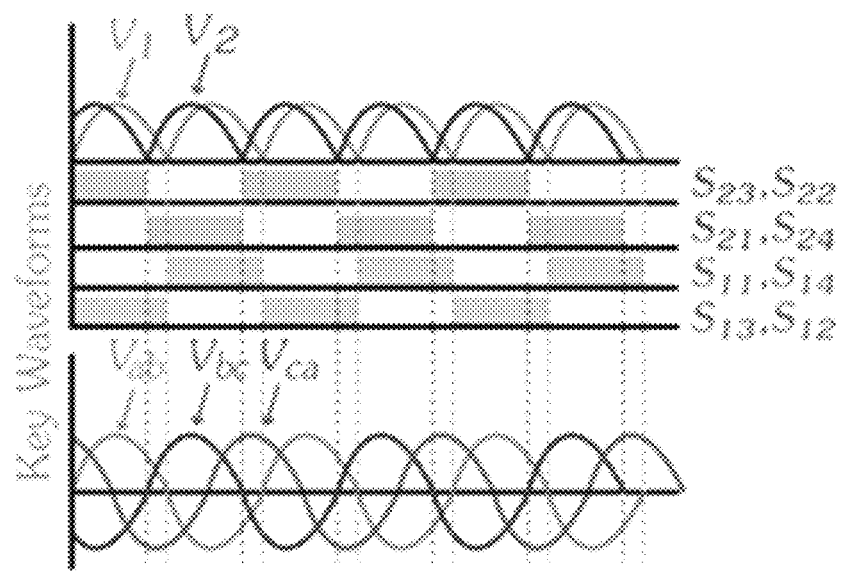
FIG. 5(c) shows waveforms of a three phase inverter system according to an embodiment of the subject invention.

FIG. 5(b) shows a controller of a three phase inverter system according to an embodiment of the subject invention, and FIG. 5(c) shows waveforms of a three phase inverter system according to an embodiment of the subject invention. A controller 700 generates several signals and controls the three phase inverter 100 based on the signals. In the controller 700, the reference line-to-line voltages can be calculated from the reference phase voltages. Referring to FIGS. 5(a) to 5(c), the first DC-DC converter 310 outputs the first converter output $V_1$ which is a folded version of $V_{ab}$, while the second DC-DC converter 360 outputs the second converter output $V_2$ which is a folded version of $V_{bc}$. The reference signal $V_{ab}^*$ is calculated from the reference signals $V_a^*$ and $V_b^*$ through a first differentiator 711, and the reference signal $V_{bc}^*$ is calculated from $V_b^*$ and $V_c^*$ through a second differentiator 712. The reference signals $V_{ab}^*$ and $V_{ab}^*$ are changed to the reference output voltage signals $V_1^*$ and $V_2^*$ through a first absolute value generator 721 and a second absolute value generator 722, respectively. The reference output voltage signals $V_1^*$ and $V_2^*$ are calculated in a third differentiator 713 and a fourth differentiator 714 with the first converter output $V_1$ and the second converter output $V_2$, respectively, and then inputted into a first closed loop controller 741 and a second closed loop controller 742, respectively. The closed loop controllers 741 and 742, G1(s) and G2(s), track the reference output voltage signals $V_1^*$ and $V_2^*$, and then provide modulation signals $V_{m1}^*$ and $V_{m2}^*$ to generate the pulse width modulation signals of the first DC-DC converter 310 and the second DC-DC converter 360. The controller 700 further comprises a first comparator 731 and a second comparator 732 to generate the switching signals of the first unfolder 410 and the second unfolder 460. The first comparator 731 provides a first signal to the first unfolder second switch $S_{12}$ and the first unfolder third switch $S_{13}$, and a second signal to the first unfolder first switch $S_{11}$ and the first unfolder fourth switch $S_{14}$. The second signal is generated by a first inverter 751 from the first signal. The second comparator 732 provides a third signal to the second unfolder first switch $S_{21}$ and the second unfolder fourth switch $S_{24}$, and a fourth signal to the second unfolder second switch $S_{22}$ and the second unfolder third switch $S_{23}$. The fourth signal is generated by a second inverter 752 from the third signal.

Figure 6:
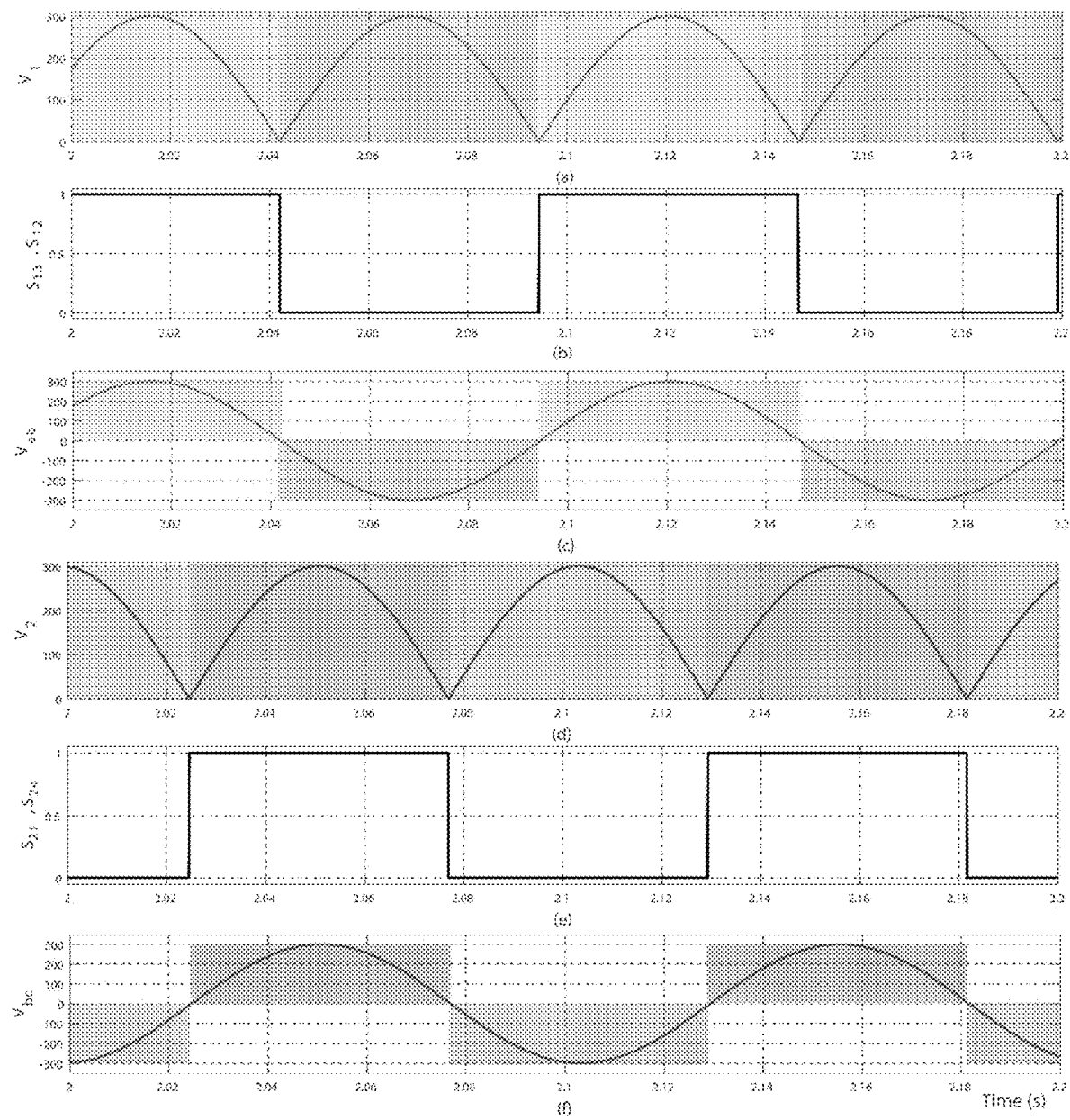
FIG. 6 shows key waveforms of a three phase inverter system according to an embodiment of the subject invention.

FIG. 6 shows key waveforms of a three phase inverter system according to an embodiment of the subject invention. Referring to FIG. 5(c) and FIG. 6, the first phase output $V_{ab}$, the second phase output $V_{bc}$, and the third phase output $V_{ca}$ have different phases, and the first converter output $V_1$ and the second converter output $V_2$ show folded characteristic. In addition, the first to fourth signals to control the unfolder switches $S_{11}$ to $S_{14}$ and $S_{21}$ to $S_{24}$ have different phases.

Figure 7:
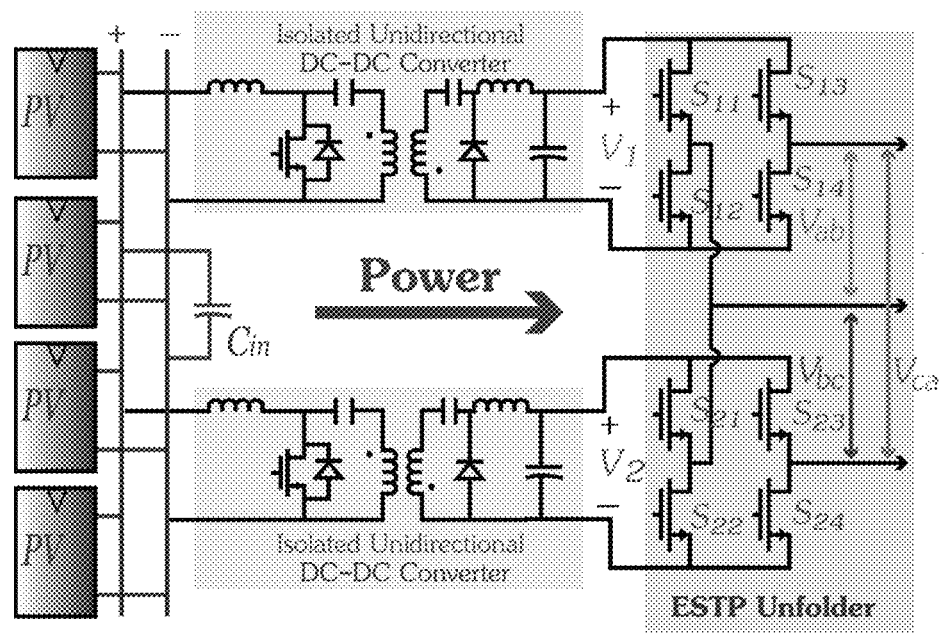
FIG. 7 shows an isolated unidirectional version of a three phase inverter system for a photovoltaic interface application according to an embodiment of the subject invention.

FIG. 7 shows an isolated unidirectional version of a three phase inverter system for a photovoltaic interface application according to an embodiment of the subject invention. Referring to FIG. 7, a three-phase isolated unidirectional inverter system with an eight-switch-three-phase (ESTP) unfolder is presented for photovoltaic interfacing application, and comprises an isolated unidirectional Ćuk converter as a DC-DC converter. Thus, the inverter system comprises only two switches operating at high frequency.

Figure 8:
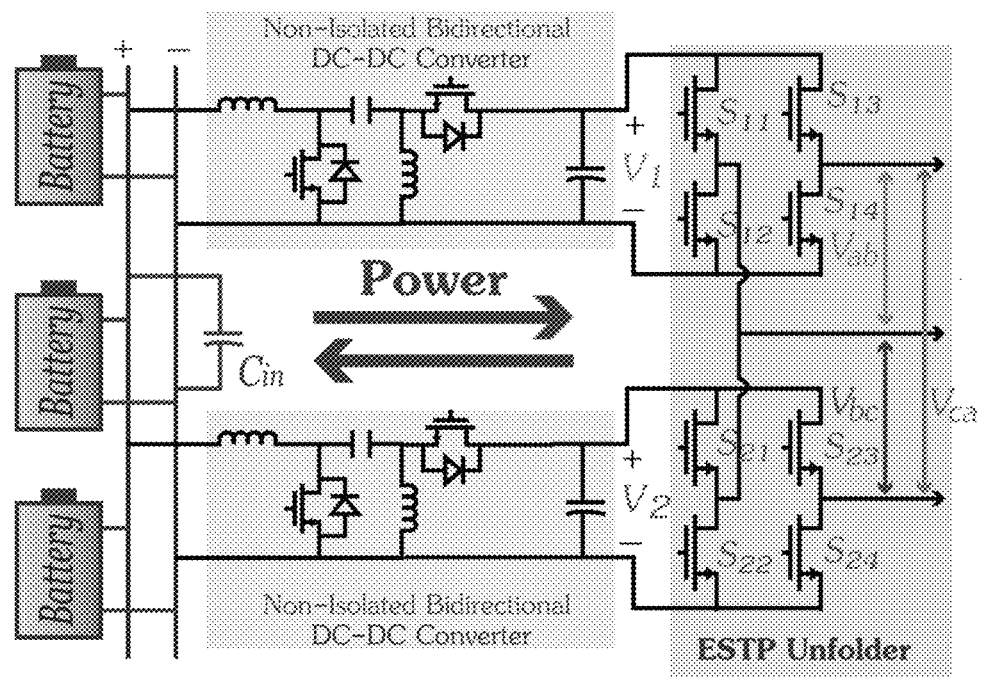
FIG. 8 shows a non-isolated bidirectional version of a three phase inverter system for energy storage interface application according to an embodiment of the subject invention.

FIG. 8 shows a non-isolated bidirectional version of a three phase inverter system for energy storage interface application according to an embodiment of the subject invention. Referring to FIG. 8, a three-phase non-isolated bidirectional inverter system with an ESTP unfolder is presented for energy storage interfacing application, and comprises a non-isolated bidirectional Sepic converter as a DC-DC converter. As a result, the inverter system comprises four switches operating at high frequency.

Figure 9:
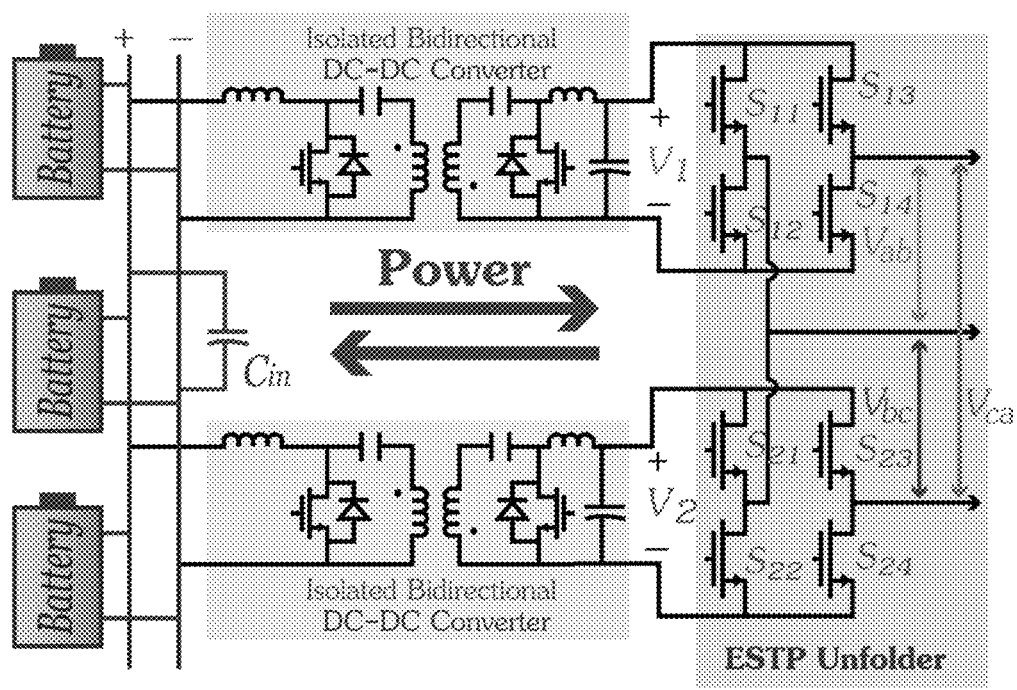
FIG. 9 shows an isolated bidirectional version of a three phase inverter system for energy storage interface application according to an embodiment of the subject invention.

FIG. 9 shows an isolated bidirectional version of a three phase inverter system for energy storage interface application according to an embodiment of the subject invention. Referring to FIG. 9, a three-phase isolated bidirectional inverter system with an ESTP unfolder is presented for energy storage interfacing application, and comprises an isolated bidirectional Ćuk converter as a DC-DC converter. In this embodiment, the inverter system comprises four switches operating at high frequency.

Referring to FIGS. 5-9, embodiments of the subject invention may use at most four switches operating at high frequency, thereby reducing the total number of high frequency switching devices. The use of less high frequency switching devices results in higher efficiency compared to competitive inverter systems, and less cooling requirement. In addition, embodiments accomplish the reduction of the cooling system size and weight yields higher power density and higher specific power. The reduction of the number of the high frequency switches results in reduction in cost because they are expensive, while the low frequency switches (for the ESTP unfolder circuit) are inexpensive.

The inverter systems according to embodiments of the subject invention can be easily configured to have custom features, such as isolation, boosting the input dc voltage, and smooth input current, and the inverter systems exhibit high quality output voltage without the need for an output filter.

The subject invention includes, but is not limited to, the following exemplified embodiments.

Embodiment 1

A three phase inverter, comprising:
a converter circuit providing a first converter output and a second converter output;
a first unfolder including a first leg and a second leg that are connected to the first converter output through a first unfolder first input node and a first unfolder second input node; and
a second unfolder including a third leg and a fourth leg that are connected to the second converter output through a second unfolder first input node and a second unfolder second input node,
a first unfolder first output node of the first leg being connected to a second unfolder first output node of the third leg through an unfolder common output node,
the second leg providing a first unfolder second output node,
the fourth leg providing a second unfolder second output node,
each of the first to fourth leg comprising two switches.

Embodiment 2

The three phase inverter according to embodiment 1, the switches operating at a line frequency.

Embodiment 3

The three phase inverter according to any of embodiments 1-2, the three phase inverter providing a first phase output between the first unfolder second output node and the unfolder common output node, a second phase output between the unfolder common output node and the second unfolder second output node, and a third phase output between the first unfolder second output node and the second unfolder second output node.

Embodiment 4

The three phase inverter according to any of embodiments 1-3, the first leg comprising a first unfolder first switch connected between the first unfolder first input node and the first unfolder first output node and a first unfolder second switch connected between the first unfolder first output node and the first unfolder second input node; and the second leg comprising a first unfolder third switch connected between the first unfolder first input node and the first unfolder second output node and a first unfolder fourth switch connected between the first unfolder second output node and the first unfolder second input node.

Embodiment 5

The three phase inverter according to any of embodiments 1-4, the third leg comprising a second unfolder first switch connected between the second unfolder first input node and the second unfolder first output node and a second unfolder second switch connected between the second unfolder first output node and the second unfolder second input node; and the fourth leg comprising a second unfolder third switch connected between the second unfolder first input node and the second unfolder second output node and a second unfolder fourth switch connected between the second unfolder second output node and the second unfolder second input node.

Embodiment 6

The three phase inverter according to any of embodiments 1-5, the converter circuit comprising a first DC-DC converter receiving an input voltage and providing the first converter output and a second DC-DC converter receiving the input voltage and providing the second converter output.

Embodiment 7

The three phase inverter according to embodiment 6, each of the first and second DC-DC converters being at least one of an isolated unidirectional DC-DC converter, a non-isolated bidirectional DC-DC converter, and an isolated bidirectional DC-DC converter.

Embodiment 8

The three phase inverter according to any of embodiments 6-7, further comprising a controller including a first comparator providing a first signal and a second signal that control the first unfolder, and a second comparator providing a third signal and a fourth signal that control the second unfolder.

Embodiment 9

The three phase inverter according to embodiment 8, the controller providing the first signal to the first unfolder second switch and the first unfolder third switch, and providing the second signal to the first unfolder first switch and the first unfolder fourth switch, and the second signal being generated through a first inverter from the first signal.

Embodiment 10

The three phase inverter according to any of embodiments 8-9, the controller providing the third signal to the second unfolder first switch and the second unfolder fourth switch, and providing the fourth signal to the second unfolder second switch and the second unfolder third switch, and the fourth signal being generated through a second inverter from the third signal.

Embodiment 11

The three phase inverter according to any of embodiments 6-10, the controller providing a first modulation signal to the first DC-DC converter and a second modulation signal to the second DC-DC converter.

Embodiment 12

A three phase inverter, comprising: a first converter and a second converter connected to an input source in parallel, respectively;
a first single phase inverter connected to the first converter through a first inverter first input node and a first inverter second input node and providing a first inverter first output node and a first inverter second output node;
a second single phase inverter connected to the second converter through a second inverter first input node and a second inverter second input node and providing a second inverter first output node and a second inverter second output node; and
a common output node connected to the first inverter first output node and the second inverter first output node.

Embodiment 13

The three phase inverter according to embodiment 12, the first single phase inverter comprising a first inverter first switch connected between the first inverter first input node and the first inverter first output node, a first inverter second switch connected between the first inverter first output node and the first inverter second input node, a first inverter third switch connected between the first inverter first input node and the first inverter second output node, and a first inverter fourth switch connected between the first inverter second output node and the first inverter second input node.

Embodiment 14

The three phase inverter according to any of embodiments 12-13, the second single phase inverter comprising a second inverter first switch connected between the second inverter first input node and the second inverter first output node, a second inverter second switch connected between the second inverter first output node and the second inverter second input node, a second inverter third switch connected between the second inverter first input node and the second inverter second output node, and a second inverter fourth switch connected between the second inverter second output node and the second inverter second input node.

Embodiment 15

The three phase inverter according to embodiment 14, the first inverter first switch to the first inverter fourth switch and the second inverter first switch to the second inverter fourth switch being operated at a line frequency.

Embodiment 16

The three phase inverter according to any of embodiments 12-15, further comprising a controller providing a first signal and a second signal that control the first single phase inverter, and providing a third signal and a fourth signal that control the second single phase inverter.

Embodiment 17

The three phase inverter according to embodiment 16, the first signal being provided to the first inverter second switch and the first inverter third switch, and second signal being provided to the first inverter first switch and the first inverter fourth switch.

Embodiment 18

The three phase inverter according to any of embodiments 16-17, the third signal being provided to the second inverter first switch and the second inverter fourth switch, and the fourth signal being provided to the second inverter second switch and the second inverter third switch.

Embodiment 19

The three phase inverter according to any of embodiments 16-18, the second signal being inverted from the first signal, and the fourth signal being inverted from the third signal.

Embodiment 20

A three phase inverter, comprising:
a first DC-DC converter connected to an input source;
a second DC-DC converter connected to the input source;
a first inverter first switch connected to the first DC-DC converter through a first inverter first input node;
a first inverter second switch connected to the first DC-DC converter through a first inverter second input node and connected to the first inverter first switch through a first inverter first output node;
a first inverter third switch connected to the first DC-DC converter through the first inverter first input node;
a first inverter fourth switch connected to the first DC-DC converter through the first inverter second input node and connected to the first inverter third switch through a first inverter second output node;
a second inverter first switch connected to the second DC-DC converter through a second inverter first input node;
a second inverter second switch connected to the second DC-DC converter through a second inverter second input node and connected to the second inverter first switch through a second inverter first output node;
a second inverter third switch connected to the second DC-DC converter through the second inverter first input node;
a second inverter fourth switch connected to the second DC-DC converter through the second inverter second input node and connected to the second inverter third switch through a second inverter second output node;
a common output node connected to the first inverter first output node and the second inverter first output node; and
a controller providing a first signal to the first inverter second switch and the first inverter third switch, a second signal to the first inverter first switch and the first inverter fourth switch, a third signal to the second inverter first switch and the second inverter fourth switch, and a fourth signal to the second inverter second switch and the second inverter third switch.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A three phase inverter, comprising:
a converter circuit generating a first converter output and a second converter output;
a first unfolder including a first leg and a second leg that are connected to the first converter output via a first unfolder first input node and a first unfolder second input node; and
a second unfolder including a third leg and a fourth leg that are connected to the second converter output via a second unfolder first input node and a second unfolder second input node,
the first leg including a first unfolder first output node,
the second leg including a first unfolder second output node,
the third leg including a second unfolder first output node,
the fourth leg including a second unfolder second output node,
each of the first to fourth leg comprising two switches,
an unfolder common output node being connected to the first unfolder first output node and the second unfolder first output node,
the three phase inverter generating a first phase output between the first unfolder second output node and the unfolder common output node, a second phase output between the unfolder common output node and the second unfolder second output node, and a third phase output between the first unfolder second output node and the second unfolder second output node,
the first leg comprising a first unfolder first switch connected between the first unfolder first input node and the first unfolder first output node and a first unfolder second switch connected between the first unfolder first output node and the first unfolder second input node: and the second leg comprising a first unfolder third switch connected between the first unfolder first input node and the first unfolder second output node and a first unfolder fourth switch connected between the first unfolder second output node and the first unfolder second input node,
the third leg comprising a second unfolder first switch connected between the second unfolder first input node and the second unfolder first output node and a second unfolder second switch connected between the second unfolder first output node and the second unfolder second input node; and the fourth leg comprising a second unfolder third switch connected between the second unfolder first input node and the second unfolder second output node and a second unfolder fourth switch connected between the second unfolder second output node and the second unfolder second input node, and
the converter circuit comprising a first DC-DC converter receiving an input voltage and generating the first converter output and a second DC-DC converter receiving the input voltage and generating the second converter output.

2. The three phase inverter according to claim 1, the switches operating at a line frequency.

3. The three phase inverter according to claim 1, each of the first and second DC-DC converters being at least one of an isolated unidirectional DC-DC converter, a non-isolated bidirectional DC-DC converter, and an isolated bidirectional DC-DC converter.

4. The three phase inverter according to claim 1, further comprising a controller including a first comparator generating a first signal and a second signal that control the first unfolder, and a second comparator generating a third signal and a fourth signal that control the second unfolder.

5. The three phase inverter according to claim 4, the controller supplying the first signal to the first unfolder second switch and the first unfolder third switch, and supplying the second signal to the first unfolder first switch and the first unfolder fourth switch, and a first inverter receiving the first signal and generating the second signal.

6. The three phase inverter according to claim 5, the controller supplying the third signal to the second unfolder first switch and the second unfolder fourth switch, and supplying the fourth signal to the second unfolder second switch and the second unfolder third switch, and a second inverter receiving the third signal and generating the fourth signal.

7. The three phase inverter according to claim 6, the controller supplying a first modulation signal to the first DC-DC converter and a second modulation signal to the second DC-DC converter.

8. A three phase inverter, comprising:
a first converter and a second converter connected to an input source in parallel, respectively;
a first single phase inverter connected to the first converter via a first input node and a second input node and including a first output node and a second output node;
a second single phase inverter connected to the second converter via a third input node and a fourth input node and including a third output node and a fourth output node; and
a common output node connected to the first output node and the third output node, the three phase inverter generating a first phase output between the second output node and the common output node, a second phase output between the common output node and the fourth output node, and a third phase output between the second output node and the fourth output node,
the first single phase inverter comprising a first inverter first switch connected between the first input node and the first output node, a first inverter second switch connected between the first output node and the second input node, a first inverter third switch connected between the first input node and the second output node, and a first inverter fourth switch connected between the second output node and the second input node,
the second single phase inverter comprising a second inverter first switch connected between the third input node and the third output node, a second inverter second switch connected between the third output node and the fourth input node, a second inverter third switch connected between the third input node and the fourth output node, and a second inverter fourth switch connected between the fourth output node and the fourth input node,
the three phase inverter further comprising a controller generating a first signal and a second ignal that control the first single phase inverter, and generating a third signal and a fourth signal that control the second single phase inverter, and
the first signal being supplied to the first inverter second switch and the first inverter third switch. and second signal being supplied to the first inverter first switch and the first inverter fourth switch.

9. The three phase inverter according to claim 8, the first inverter first switch to the first inverter fourth switch and the second inverter first switch to the second inverter fourth switch being operated at a line frequency.

10. The three phase inverter according to claim 8, the third signal being supplied to the second inverter first switch and the second inverter fourth switch, and the fourth signal being supplied to the second inverter second switch and the second inverter third switch.

11. The three phase inverter according to claim 10, the second signal being inverted from the first signal, and the fourth signal being inverted from the third signal.

12. A three phase inverter, comprising:
- a first DC-DC converter connected to an input source;
- a second DC-DC converter connected to the input source;
- a first inverter first switch connected to the first DC-DC converter via a first inverter first input node;
- a first inverter second switch connected to the first DC-DC converter via a first inverter second input node and connected to the first inverter first switch via a first inverter first output node;
- a first inverter third switch connected to the first DC-DC converter via the first inverter first input node;
- a first inverter fourth switch connected to the first DC-DC converter via the first inverter second input node and connected to the first inverter third switch via a first inverter second output node;
- a second inverter first switch connected to the second DC-DC converter via a second inverter first input node;
- a second inverter second switch connected to the second DC-DC converter via a second inverter second input node and connected to the second inverter first switch via a second inverter first output node;
- a second inverter third switch connected to the second DC-DC converter via the second inverter first input node;
- a second inverter fourth switch connected to the second DC-DC converter via the second inverter second input node and connected to the second inverter third switch via a second inverter second output node;
- a common output node connected to the first inverter first output node and the second inverter first output node; and
- a controller supplying a first signal to the first inverter second switch and the first inverter third switch, a second signal to the first inverter first switch and the first inverter fourth switch, a third signal to the second inverter first switch and the second inverter fourth switch, and a fourth signal to the second inverter second switch and the second inverter third switch,
- the three phase inverter generating a first phase output between the first inverter second output node and the common output node, a second phase output between the common output node and the second inverter second output node, and a third phase output between the first inverter second output node and the second inverter second output node.

* * * * *